(12) United States Patent
Kim

(10) Patent No.: US 6,421,353 B1
(45) Date of Patent: Jul. 16, 2002

(54) MOBILE RADIO TELEPHONE CAPABLE OF RECORDING/REPRODUCING VOICE SIGNAL AND METHOD FOR CONTROLLING THE SAME

(75) Inventor: Yun-Hyang Kim, Kumi (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/252,374

(22) Filed: Feb. 18, 1999

(30) Foreign Application Priority Data

Feb. 18, 1998 (KR) .............................................. 98-5029

(51) Int. Cl.[7] .............................. H04J 3/16; H04J 3/22
(52) U.S. Cl. ........................ 370/465; 455/550; 379/67.1
(58) Field of Search ................................. 370/465, 470, 370/479, 328, 335, 342, 395, 252, 253, 229, 232, 395.64, 395.65, 472, 476, 484; 455/412, 550, 575; 379/67.1, 68, 71, 266.1

(56) References Cited

U.S. PATENT DOCUMENTS

| | | | | |
|---|---|---|---|---|
| 5,920,554 A | * | 7/1999 | Nakamura et al. | 370/335 |
| 6,021,123 A | * | 2/2000 | Mimura | 370/331 |
| 6,021,325 A | * | 2/2000 | Hall | 455/412 |
| 6,058,165 A | * | 5/2000 | Sato | 379/88.07 |
| 6,072,860 A | * | 6/2000 | Kek et al. | 379/88.25 |
| 6,076,052 A | * | 6/2000 | Bannai et al. | 704/201 |
| 6,092,082 A | * | 7/2000 | Maruyama | 707/200 |
| 6,097,716 A | * | 8/2000 | Abrishamkar | 370/342 |
| 6,138,091 A | * | 10/2000 | Haataja et al. | 704/215 |
| 6,141,353 A | * | 10/2000 | Li | 370/465 |
| 6,167,079 A | * | 12/2000 | Kinnunen et al. | 375/225 |

\* cited by examiner

*Primary Examiner*—Dang Ton
*Assistant Examiner*—Brian Nguyen
(74) *Attorney, Agent, or Firm*—Dilworth & Barrese, LLP

(57) ABSTRACT

The present invention relates generally to a mobile radio telephone capable of recording and reproducing received frame data of voice channels, a data rate of which varies based on a voice traffic per unit time. The mobile radio telephone comprises a memory for storing and outputting data according to a control operation, a recording controller for sequentially storing format byte and data packets included in a voice channel frame inputted at a predetermined time period in response to a recording command in communication mode, a reproducing controller for analyzing a format byte of the voice channel frame sequentially stored in the memory and accessing data rate information and packet data in a frame unit, to thereby supply the accessed data to the decoder in response to the reproducing command in an idle mode and a digital-to-analog converter for converting a voice sample data outputted from the decoder into an analog signal.

11 Claims, 6 Drawing Sheets

MOBILE RADIO TELEPHONE CAPABLE OF RECORDING/REPRODUCING VOICE SIGNAL AND METHOD FOR CONTROLLING THE SAME

BACKGROUND OF THE INVENTION

1. Technical Field

The present invention relates generally to wireless communication and in particular, to a mobile radio telephone capable of recording and reproducing received frame data of voice channels.

2. Description of the Related Art

In general, a digital mobile communication system has advantages over analog systems both in terms of more efficient use of the frequency spectrum and superior speech quality. Digital mobile communication systems can be generally divided into GSM (Global Systems for Mobile Communication) systems and CDMA (Code Division Multiple Access) systems. The IS-95 (Interim Standard-95) DS/CDMA system has been adopted in both Korea and in the U.S.A. for applications such as PCS (Personal Communication Systems) and digital mobile radio communication systems.

In a mobile radio communication system employing the IS-95 DS/CDMA standard, a transmitter encodes voice data using a vocoder (i.e., a voice coder and decoder) and then converts the encoded data into a frame format having a plurality of data rates. For example, the vocoder in a transmission section of an IS-95 DS/CDMA system can set the data rate of the voice signal to one of the following data rates according to the voice traffic per unit time: full data rate, ½ rate, ¼ rate, and ⅛ rate. The frame format of the voice data is 20 ms irrespective of the selected data rate. The vocoder of the transmitting party selects a data rate on the basis of the voice signal activity per unit time. A base station changes the length of the data packet within a frame according to the variable data rate, thereby transmitting the frame data.

Mobile radio telephones employing the IS-95 DS/CDMA standard are manufactured and sold by a plurality of communication equipment manufacturers such as QUALCOMM, MOTOROLA and SAMSUNG.

Mobile radio telephones employing the DS/CDMA system detect the frame data rate for a current voice channel by detecting a format byte contained within the frame data of a forward traffic voice channel. Having detected the data rate, the mobile radio telephone then decodes encoded voice data in accordance with the detected data rate. The vocoder of the mobile radio telephone decodes an information bitstream as part of a data packet within the received frame data as a PCM (Pulse Code Modulation) voice sample in accordance with a QCELP (QUALCOMM Codebook Excited Linear Prediction) algorithm. The voice data which is decoded as a PCM voice sample by the vocoder is reproduced as an analog voice signal by a PCM codec and is converted into an audible signal by a speaker.

While the general mobile radio telephone is capable of processing both the voice signal of the forward traffic channel and the voice signal of a reverse traffic channel, it is not capable of recording and reproducing voice messages transmitted from a communicating party (i.e., memo function). For example, in the case where a telephone number is provided from a transmitting party, the user must inconveniently manually record the number as it is spoken otherwise, the information is lost.

Thus, there is a need for a mobile radio telephone capable of recording and reproducing voice messages transmitted from a communicating party.

SUMMARY OF THE INVENTION

It is therefore an object of the present invention to provide a method and apparatus for recording and reproducing voice messages transmitted from a communicating party via a forward traffic channel.

It is another object of the present invention to provide a mobile radio telephone for recording and reproducing received frame data of a voice channel where the data rate varies depending on voice traffic per unit time.

According to one aspect of the present invention, a mobile radio telephone is provided having a decoder for decoding an input data packet comprising encoded voice sample data based on a predetermined decoding mode, wherein the decoding mode is set according to a supplied data rate. The mobile radio telephone comprises a memory for storing and outputting data according to a control operation; a recording controller for sequentially storing a format byte and a data packet included in a voice channel frame, input in response to a recording command in a communication mode; a reproducing controller for analyzing a format byte of the voice channel frame sequentially stored in the memory and packet data rate information and packet data in a frame unit, to thereby supply the accessed data to a decoder in response to a reproducing command in an idle mode; and a digital-to-analog converter for converting a voice sample data outputted from the decoder into an analog signal.

BRIEF DESCRIPTION OF THE DRAWINGS

The above object and advantages of the present invention will become more apparent by referring to the following detailed description of a preferred embodiment, with reference to the attached drawings in which.

DETAILED DESCRIPTION OF THE PREFERRED EMBODIMENT

Hereinafter, the detailed explanation of a preferred embodiment of the present invention will be given with reference to the attached drawings.

Figure 1:
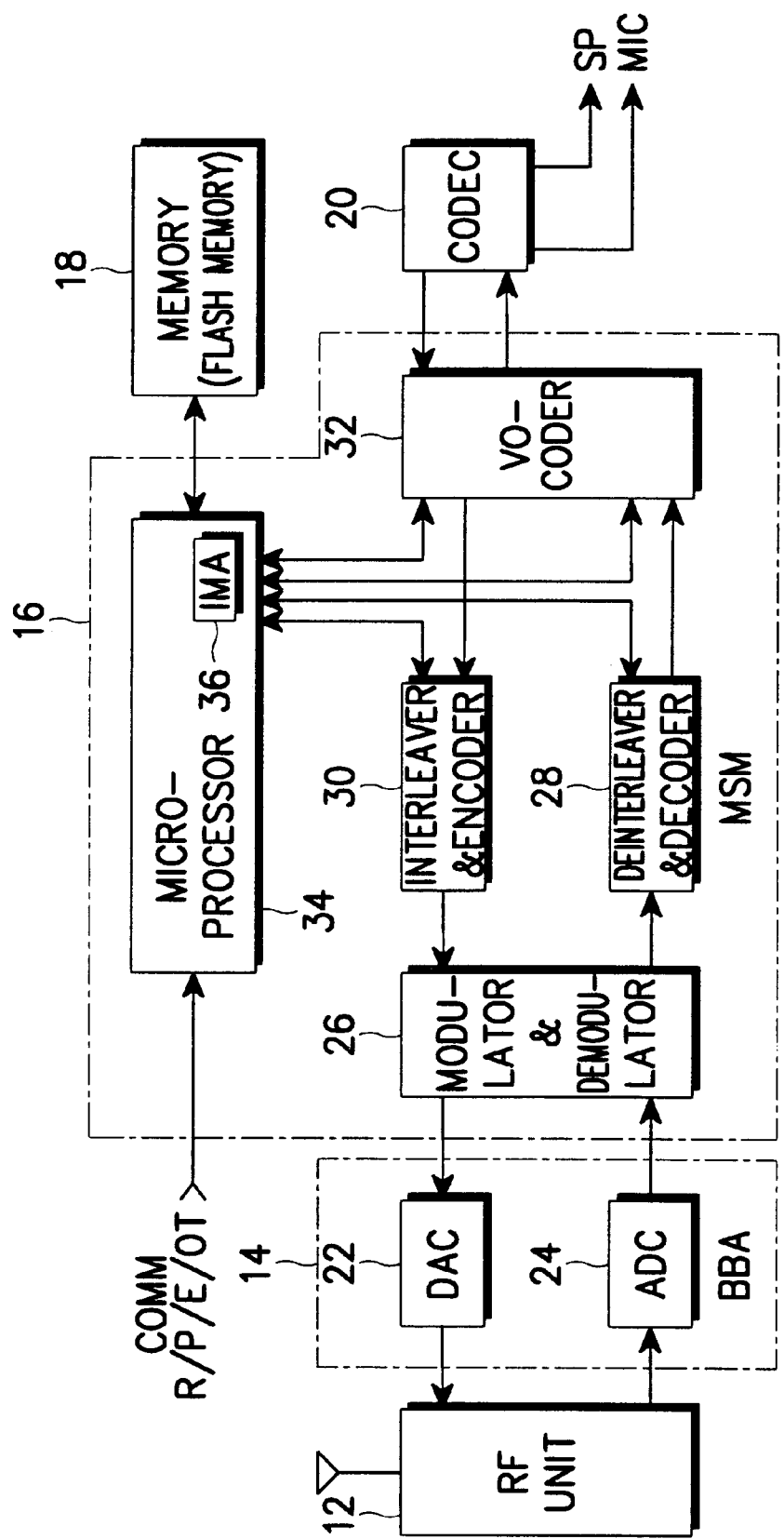
FIG. 1 is a block diagram which illustrates a mobile radio telephone according to the present invention.

FIG. 1 is a block diagram illustrating a mobile radio telephone in a CDMA communication system according to one embodiment of the present invention, wherein data of a forward traffic channel is recorded as a voice signal in response to a record command supplied by a mobile station user. The recorded voice signal may then be reproduced in response to a reproduce command while in an idle mode. Prior to receiving frame data in a forward traffic channel, a mobile radio telephone must first be synchronized with a sync channel and paged by data of a paging channel, transmitted from a base station.

Referring to FIG. 1, an RF (Radio Frequency) modulated signal is received via an antenna, then, as is well known in the art, an RF unit 12 down-converts the modulated RF signal to an intermediate (IF) signal to be supplied to an ADC (Analog to Digital Converter) 24 which is disposed within the base band analog (BBA) circuit 14. The ADC 24 within the BBA circuit converts analog signals into a digital signal. The BBA circuit 14 may be implemented by using a chip such as a BBA2. X (Q5312 CDMA) manufactured by QUALCOMM of U.S.A. Other similar hardware can be utilized as well for the BBA circuit. The digital signal output from the ADC 24 is supplied to a MODEM (Modulator and Demodulator) 26 within a MSM (Mobile Station Modem) 16 as shown in FIG. 1. The MODEM 26 demodulates and symbol combines the supplied digital data and outputs symbol combined digital data to a deinterleaver and decoder 28. The deinterleaver and decoder 28 deinterleaves and decodes the symbol-combined data to output error corrected information bits. A microprocessor 34 within the MSM 16 of FIG. 1 detects the frame format by reading the error corrected information bitstream supplied by the deinterleaver and decoder 28 as a 20 ms unit. Then, the microprocessor 34 accesses data rate information from the format byte within the received data frame and forwards the data packet and associated data rate information to the vocoder 32. It should be noted that the microprocessor 34 accesses the deinterleaved and decoded information bitstream within a frame format having a period of 20 ms to correspond to the voice channel frame of the CDMA forward traffic channel transmission period of 20 ms.

Figure 2:
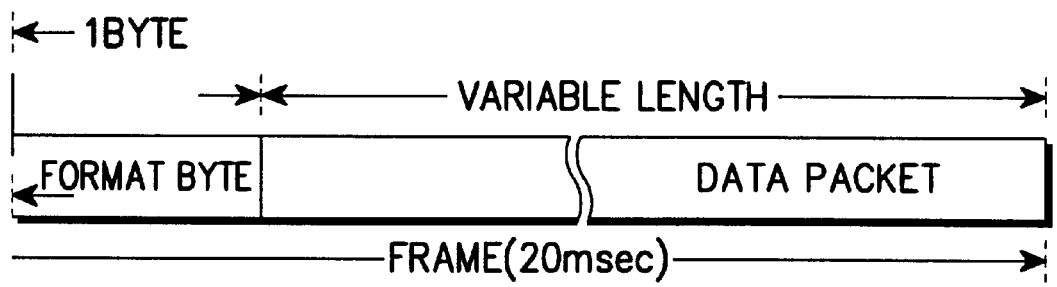
FIG. 2 illustrates a frame structure of a conventional communication channel in a mobile communication system.

FIG. 2 illustrates a voice frame data format of a forward traffic channel in a mobile communication system. The frame format consists of a single format byte and a data packet. The data packet size varies according to the voice traffic per unit time. The following table illustrates a data bit map for the frame format.

TABLE 1

| BITs | NAME | DESCRIPTION |
|---|---|---|
| 7 | 13K_PACKET_DATA | This bit indicates a data rate of a packet data inputted to a vocoder. 1 = 13 Kpbs |
| 6 | RESERVED | This bit is 0. |
| 5 | LOAD_FIR | |
| 4 | VOC_DEC_BAD_RX_DATA | |
| 3 | VOC_DEC_ERASURE | This bit indicates an erasure frame. |
| 2 | VOC_DEC_BLANK | This bit indicates a blank frame. |
| 1:0 | VOC_DEC_RATE | Vocoder Rate (Data Rate) 00 = full rate 01 = ½ rate 10 = ¼ rate 11 = ⅛ rate |

(* In the above table, the term "VOC" refers to a "vocoder" and the "DEC" to "decoder".)

Referring again to FIG. 2, the total period of the frame format of the voice channel is 20 ms comprising a single format byte, and a data packet, having a variable length according to the voice traffic per unit time.

Referring back to FIG. 1, the microprocessor 34 detects the frame data rate of the voice channel in each 20 ms frame, as illustrated in FIG. 2, and forwards the frame data rate, defined by bits 0 and 1 of the format byte, to the vocoder 32 along with the packet data which sequentially follows the format byte. Here, the data rate, encoded by bits 0 and 1, define the bit rate of the packet data forwarded from the transmitting party. Under the control of microprocessor 34 the data rate is recorded in a vocoder decoder packet register (VOC_DEC_PACKET) internal to the vocoder 32. Then, the vocoder 32 decodes the data packet in accordance with the decoded data rate and outputs decoded data from the vocoder 32 as PCM (Pulse Code Modulation) voice data.

The PCM voice data output from the vocoder 32 is then input to the PCM codec 20 (coder and decoder) which converts the PCM voice data sample into an analog voice signal which is provided to a speaker (SP) for conversion to an audible signal.

Referring now to the reverse link traffic channel of FIG. 1, an analog voice signal is output from the microphone (MIC) and converted into PCM voice sample data in the PCM codec 20 positioned on the path of the reverse link traffic channel and then, in the vocoder 32, encoded at an appropriate data rate. The signal processing sequence of the reverse link traffic channel operates in the reverse manner to that described by the forward traffic channel as stated above. That is, the signal flow of the reverse link traffic channel is as follows; the codec 20, the vocoder 32, an interleaver and encoder 30, the MODEM 26, the DAC (Digital to Analog Converter) 22 of the BBA 14 and RF unit 12.

The microprocessor 34 of the MSM 16, illustrated in FIG. 1, comprises a recording controller for recording the received voice data of the forward traffic channel to a memory device 18 in accordance with an external record command (See COMM in FIG. 1). The microprocessor 34 further comprises a reproducing controller (not shown) for accessing and reproducing the recorded voice data recorded from the memory device 18. The memory device 18 in the preferred embodiment is separate from MSM 16 as shown in FIG. 1. Also in the preferred embodiment, the memory device 18 is constructed from flash memory components.

Figure 3:
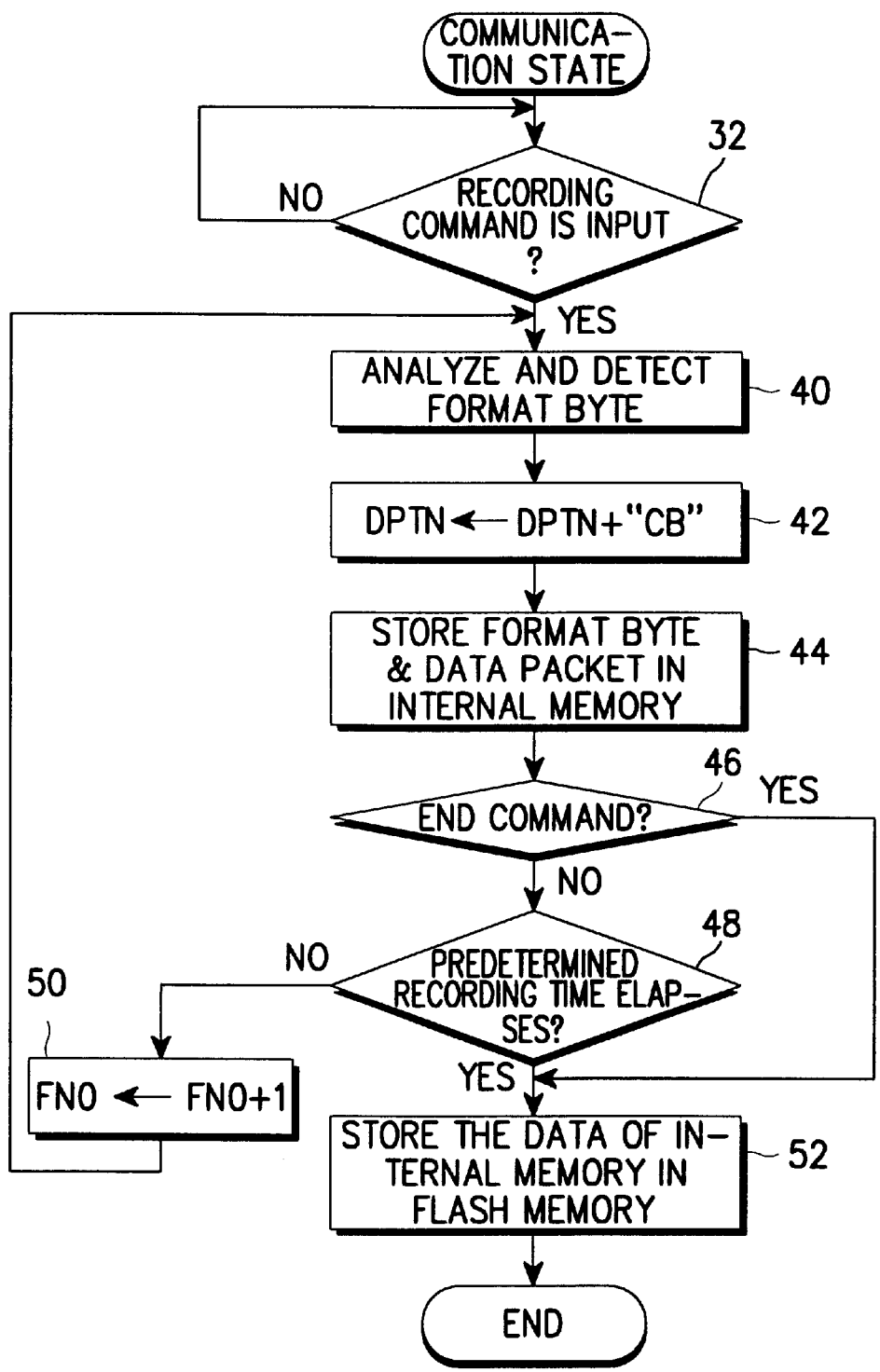
FIG. 3 is a flow chart illustrating a method for recording frame data of an occupied communication channel according to the present invention.

FIG. 3 is a flow chart for a method illustrating recording frame data in accordance with the present invention. Specifically, FIG. 3 illustrates a control procedure performed by the recording controller in the microprocessor 34 of FIG. 1. The recording controller control program is masked in the memory 18 of FIG. 1.

At step 38, the recording controller checks whether a record command is input by a user. The record command key may be input by a user by selecting the record key on a key panel of the mobile telephone. Selecting the record command key permits the user to record voice messages transmitted from a communicating party. Selecting the record key sends the record command (COMM-R) as input to the microprocessor 34 of FIG. 1. Next, at step 40, the recording controller detects and analyzes the format byte contained within an information bit stream output from the deinterleaver and decoder 28. The bit stream is an error corrected bit stream with a period of 20 ms comprising a format byte and a variable length data packet.

After analyzing the format byte at step 40, the recording controller proceeds to step 42. At step 42, the recording controller stores the current data packet byte count (CB) and the total number of format byte the data rate information of the format byte, in a data counter buffer (DPTN: data packet total number). Next, at step 44, the recording controller stores the voice data frame (i.e., detected format byte and associated variable length data packet) of the forward traffic channel in the internal memory 36.

Figure 5:
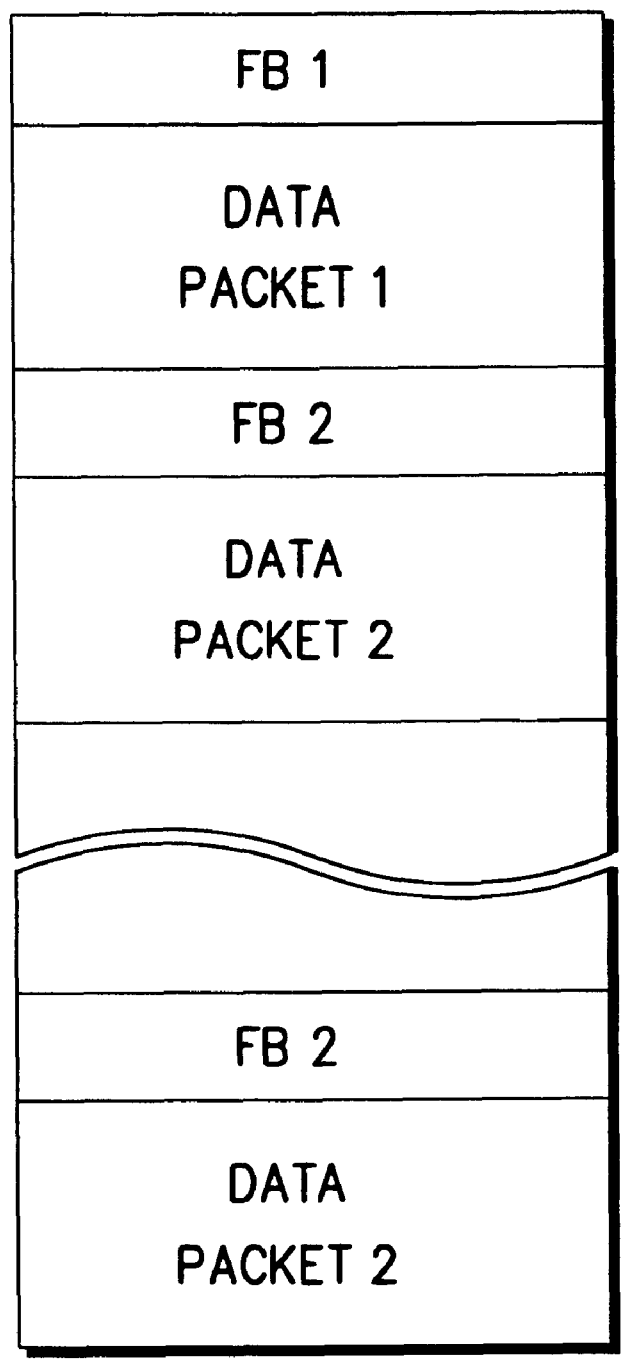
FIGS. 5 is a table of an internal memory of a microprocessor illustrated in FIG. 1.

According to the above operation, as illustrated in FIG. 5, the format byte FBi (where "i" is a positive integer representing the ith received frame format) and DATA PACKET i are sequentially stored in the internal memory 36 of the microprocessor 34. After storing the voice data frame of the forward traffic channel in the internal memory 36 at step 44, the recording controller proceeds to step 46. At step 46, the recording controller checks whether an end command has been received. If not, then at step 48, the recording controller checks whether the predetermined recording time has elapsed. If the end command has not been received at step 46, the predetermined recording time is checked to determine whether recording time remains. If so, the process proceeds to step 50. At step 50, the recording controller increases the frame counter (FNO) established in the internal memory 36 and then, returns to the step 40, to repeat steps 40–48.

Otherwise, if the end command (COMM-E) is not received and the predetermined time has elapsed since the input of an external recording command (COMM-R), at step 52, both the format byte of the frame data and the associated data packets are stored in the memory device 18, as illustrated in FIG. 1. Here, the frame counter (FNO) 50 stores the number of stored frames of the frame number and the data counter buffer (DTPN) stores the total byte count.

Figure 6:
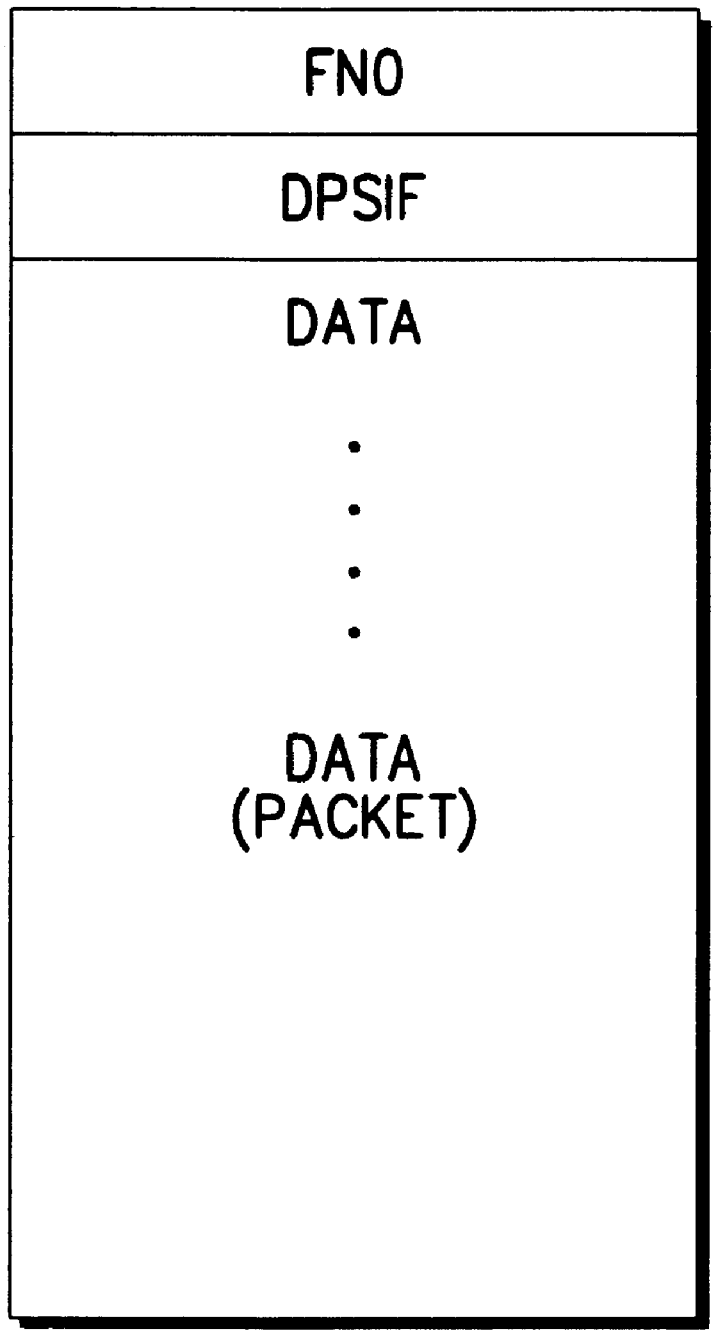
FIG. 6 is a table of a flash memory table of FIG. 1.

Otherwise, at step 46 of FIG. 3, if the end command (COMM-E) is entered or if the number of bytes of the recorded data packet exceeds a predetermined byte count at a point in time when the predetermined recording time elapses, then the recording controller, in step 52, accesses all of the information stored in the internal memory 36 (i.e., the frame number (FNO), accumulated data packet (DTPN), the format byte FBi and data packet (DATA PACKET i)) and stores the information in the flash memory 18 in accordance with FIG. 6. Thereafter, the recording controller ends the recording operation.

FIG. 6 is a memory table of a flash memory 18 of FIG. 1 In FIG. 6, DPSIF is a counter for storing the total number of bytes in the data stream which have been stored in the internal memory. That is, DPSIF refers to the sum of the format byte (FB i) and the data packet byte count (DATA PACKET i). In the present embodiment, received voice data of the forward traffic channel is stored in a flash memory 18 to allow external storage of the recorded voice data irrespective of whether power of the mobile radio telephone is on or off.

As previously stated, in accordance with the operation of the recording controller of the microprocessor 34, the data rate of the frame data of the forward traffic channel and the corresponding data packet are sequentially stored in the flash memory 18.

Figure 4:
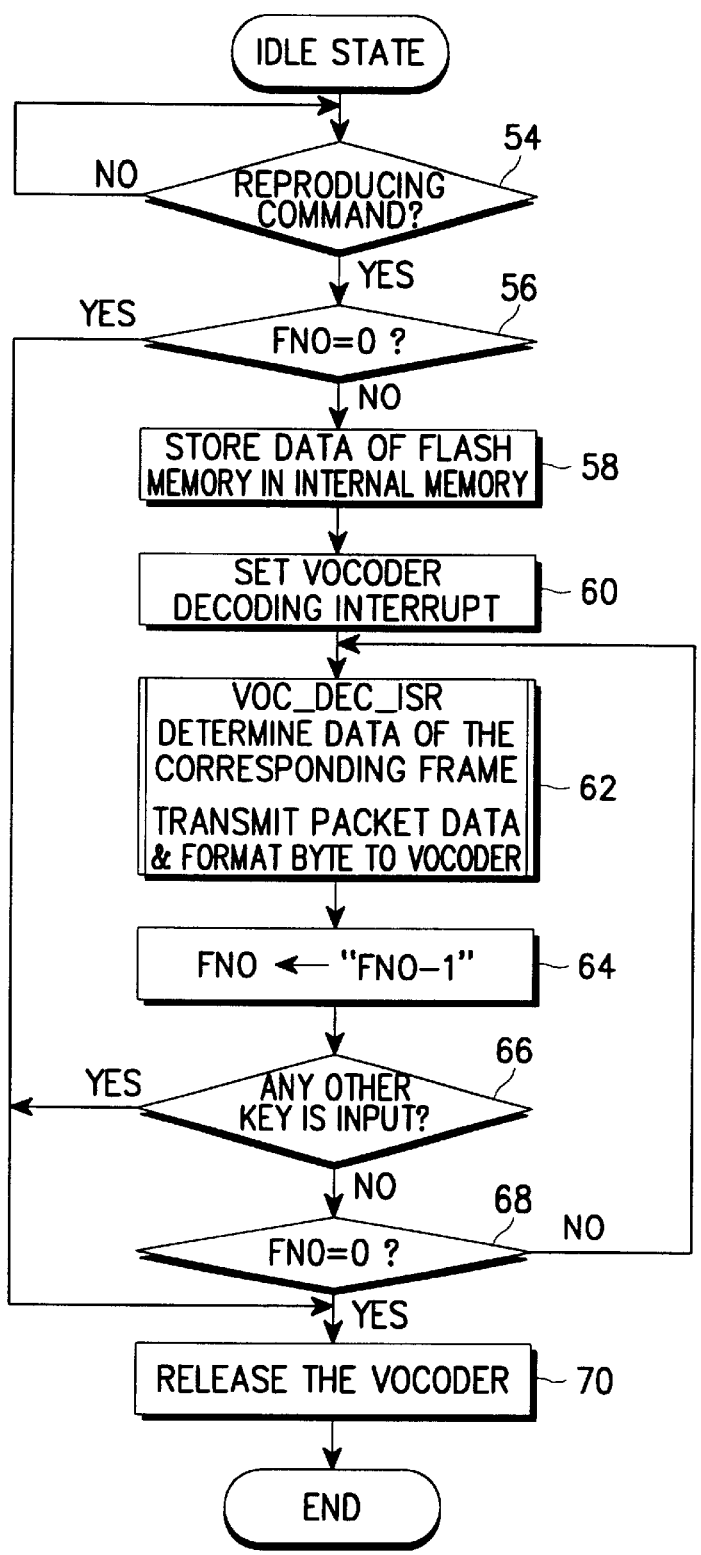
FIG. 4 is a flow chart illustrating a method for decoding packet data within frame data of a communication channel as a voice signal according to an embodiment of the present invention.

The voice data of the forward traffic channel stored in the memory 18 may then be reproduced by a reproducing controller of the microprocessor 34 and then output as an audible signal. FIG. 4 is a flow chart showing a procedure for decoding packet data of frame data of a communication channel as a voice signal according to an embodiment of the present invention. That is, it illustrates a control procedure of the reproducing controller in the microprocessor 34 of FIG. 1. As previously stated, the control program of the reproducing controller is also masked in the memory 18 of FIG. 1.

Referring to FIG. 4, during an idle mode, (i.e., the mobile radio telephone in a call enable condition), the reproducing controller of the microprocessor 34, at step 54, checks whether a reproducing command (COMM-P—command play) has been received. In order to reproduce the voice message recorded by a user, if the reproducing key of the key panel is selected then at step 54, the reproducing controller accesses the frame counter (FNO) and the data counter (DPSIF) stored in the flash memory 18 and checks whether the frame number (FNO) is zero. A frame (FNO) of zero implies that either packet data associated with the current frame format was not stored in memory or that all the data packets have been accessed and reproduced. If it is zero, the process proceeds directly to step 70 to release vocoder 32 and terminate recording.

If it is determined that the frame counter (FNO) is not zero, the method proceeds to step 58 where the reproducing controller reads out the value of the frame counter (FNO) and the data counter (DPSIF). Then, the reproducing controller accesses the format byte and data packet corresponding to the value of the frame counter (FNO) and data counter (DPSIF) in the memory 18 (flash memory) for storage in the internal memory 36. Then, the process continues at step 60 where the reproducing controller acquires the vocoder 32 to establish a decoding interrupt.

The process continues at step 62 where an analysis of the contents of the first frame format byte in the vocoder decoding interrupt service routine (VOC_DEC_ISR) is performed. Then, the reproducing controller determines whether the packet data size is 8K or 13K, (i.e., the vocoder data rate) and whether the frame is a blank frame or an erasure frame. The reproducing controller then stores a data packet and a corresponding format byte in a vocoder_decoder_packet register of the vocoder 32. The vocoder 32 decodes the format byte and data packet of the corresponding frame supplied from the reproducing controller in accordance with the vocoder data rate and then provides a PCM voice data sample of the corresponding frame with a codec 20. The codec 20 converts the PCM voice data sample into an analog signal and then outputs the analog signal as audio via the speaker (SP) connected to an output terminal.

The process then proceeds to step 64 where the value of the frame counter FNO is decremented by one (1). In step 66, the reproducing controller checks whether any other key signal (i.e., COMM command) has been received. If another key signal is input, the process proceeds to step 70, to release the vocoder 32 and interrupts the voice reproducing operation, to jump to the corresponding key signal processing routine.

Otherwise, if no other key signal is input at step 66, the process proceeds to step 68, to check whether the value of the frame counter (FNO) established in the internal memory 36 is zero (0). If the value of the frame counter (FNO) is not zero, the reproducing controller repeats step 62, accessing the next frame format byte and the corresponding data packet in the memory to be provided to the vocoder, and decrements the value of the frame counter FNO.

The reproducing controller decrements the value of the frame counter recorded in the internal memory and performs the reproduction operation for a number of additional iterations equal to the value of the frame counter (FNO). If any other key is input, then the reproducing controller ends the vocoder_decoding_interrupt service routine of the vocoder 32 and simultaneously, at step 70, releases the vocoder 32, to thereby end the reproducing operation.

FIGS. 5 and 6 show memory tables according to an embodiment of the present invention. FIG. 5 is a table of an internal memory 36 of the microprocessor 34 of FIG. 1, and FIG. 6 is a table of a flash memory 18 of FIG. 1. Further, the internal memory 36, illustrated in FIG. 5, is a RAM (Random Access Memory) and the memory 18, illustrated in FIG. 6, is a flash memory.

As stated above, the present invention is advantageous in that when the forward traffic channel is received in the digital mobile radio telephone, the voice channel data is recorded and reproduced, to thereby preserve messages sent from a calling party.

While the present invention has been described in detail with reference to the specific embodiment of the present invention, it is a mere exemplary application. Thus, it is to be clearly understood that many variations can be made by anyone skilled in the art within the scope and spirit of the present invention.

What is claimed is:

1. A mobile radio telephone in a radio communication system for recording and reproducing voice messages transmitted from a communicating party via a forward traffic channel, said mobile radio telephone comprising:
   a) a decoder for decoding a plurality of data packets and generating digital voice sample data as output;
   b) a memory for storing and outputting voice channel frame data comprising a format byte containing at least a data rate of said plurality of data packets and said plurality of data packets, in separate memory areas;
   c) a recording controller for controlling the storage of said voice channel frame data into said memory responsive to a recording command when in a communication mode;
   d) a reproducing controller for analyzing the format byte stored in said memory to determine the data rate among a plurality of data rates, and supplying said plurality of data packets stored in said memory to said decoder responsive to a reproducing command when in an idle mode; and
   e) a digital-to-analog converter for converting said digital voice sample data output from said decoder into an analog signal for audible reproduction.

2. The mobile radio telephone as claimed in claim 1, wherein each packet of said plurality of data packet represents voice sample data.

3. The mobile radio telephone as claimed in claim 1, wherein said decoder decodes said plurality of data packets according to data rate information supplied as part of said format byte of said voice channel frame data.

4. The mobile radio telephone as claimed in claim 1, wherein said recording controller:
   a) stores a format byte included in an information bitstream and a plurality of data packets of an input voice channel frame in the memory; and
   b) accumulates information including a voice channel frame number and a byte count of said plurality of data packets to be stored in the memory.

5. The mobile radio telephone as claimed in claim 1, wherein said voice channel frame has a period of 20 ms.

6. A mobile radio telephone for receiving and reproducing frame data of a forward traffic voice channel, said frame data including a format byte and a plurality of data packets, wherein a data rate of said plurality of data packets varies according to a voice traffic per unit time, said telephone comprising:
   a) a demodulator for demodulating and symbol-combining frame data of said forward traffic channel;
   b) a deinterleaver and decoder for deinterleaving and decoding said symbol combined frame data, to thereby output an error corrected information bitstream;
   c) a decoder for decoding said plurality of data packets;
   d) a recording controller for:
      analyzing said format byte included in said error corrected information bitstream;
      supplying a vocoder with a data rate and said plurality of data packets; and
      storing a frame count, a plurality of data packets, and a format byte, respectively, in specific flash memory areas responsive to a recording command; and
   e) a reproducing controller for accessing said format byte and said plurality of data packets corresponding to said frame count stored in said flash memory, and determining a pertinent data rate among a plurality of data rates, and providing the accessed format byte and said plurality of data packets to said decoder in response to a reproducing command;
   wherein after said format byte is stored in said flash memory, said reproducing controller analyzes said format byte data to determine said data rate.

7. A method for recording/reproducing voice signals in a mobile radio telephone, said telephone including a decoder for decoding a plurality of data packets in accordance with a predetermined data rate and reproducing said plurality of decoded data packets as a voice signal, and a memory for storing and outputting data in response to a control operation, said method comprising the steps of:
   a) storing a format byte and said plurality of data packets of a voice channel frame, in specific memory areas, respectively, responsive to a record command when in a communication mode;
   b) analyzing said stored format byte in said voice channel frame to determine at least said predetermined data rate;
   c) accessing said plurality of data packets in said voice channel frame from said memory;
   d) setting said decoder to said predetermined data rate among a plurality of data rates; and
   e) supplying said plurality of accessed data packets to the decoder responsive to an input reproducing command when in an idle mode.

8. The method as claimed in claim 7, wherein said step (a) further comprises the steps of:
   i) analyzing the format byte included in the voice channel frame to determine a data rate;
   ii) accumulating the total number of information relative to the frame and the data packet to the memory; and
   iii) ending a recording operation responsive to either an ending command or whenever the total number of data packets accumulated exceeds a predetermined capacity.

9. The method as claimed in claims 8, wherein the format byte, the plurality of data packets and the accumulated information are stored in a temporary memory, in said step ii).

10. The method as claimed in claim 9, wherein the temporary memory is a flash memory.

11. The method as claimed in claim 8, further comprising the steps of:
   e) analyzing the format byte of a previous input frame stored in the memory in response to a reproducing command;
   f) supplying a vocoder with a plurality of data packets and the format byte; and
   g) reproducing recorded voice data as an audible sound.

* * * * *